United States Patent

[11] 3,623,155

[72] Inventors Mu-Yue Hsiao
Poughkeepsie;
Eugene Kolankowsky, Pleasant Valley, both of N.Y.

[21] Appl. No. 887,858
[22] Filed Dec. 24, 1969
[45] Patented Nov. 23, 1971

[73] Assignee International Business Machines Corporation
Armonk, N.Y.

[54] OPTIMUM APPARATUS AND METHOD FOR CHECK BIT GENERATION AND ERROR DETECTION, LOCATION AND CORRECTION
20 Claims, 4 Drawing Figs.

[52] U.S. Cl. 340/146.1
[51] Int. Cl. G06f 11/10
[50] Field of Search 340/146.1; 235/153

[56] References Cited
UNITED STATES PATENTS

| | | | |
|---|---|---|---|
| 3,458,860 | 7/1969 | Shimabukuro | 340/146.1 |
| 3,398,400 | 8/1968 | Rupp et al. | 340/146.1 |
| 3,416,132 | 12/1968 | MacSorley | 340/146.1 |
| 3,411,135 | 11/1968 | Watts | 340/146.1 |
| 3,504,340 | 3/1970 | Allen | 340/146.1 |

*Primary Examiner*—Charles E. Atkinson
*Attorneys*—Hanifin and Jancin and Gunter A. Hauptman

ABSTRACT: Errors in code words transmitted over a communication path are detected and corrected by optimum apparatus at transmitting and receiving ends of the path. Illustratively, a 72 bit parallel code word, comprising a 64 bit information portion and an eight bit check portion is communicated between a transmitter and a receiver. A check bit generator at the transmitter generates eight check bits as a function of the 64 information bits, each check bit being associated with a number of information bits (a check bit and its associated information bits forming a "code group"). The information bits and check bits are communicated to the receiver where an error detector compares check bits generated from the received information bits with the received check bits and an error locator analyzes any mismatch to determine the location of an error. An error corrector then corrects any information or check bit which is identified as incorrect by the error locator. The check bit generator at the transmitter supplies signals, at outputs corresponding to the check bits, by Exclusive ORing the information bits in its code group, in accordance with a single error correction and double error detection (SEC/DED) code. The error detector examines each code group separately by Exclusive ORing both its information and check bits in accordance with the same code and supplies syndrome signals manifesting the result of the examination. Error detection and correction are possible because, upon transmission, each code group contains an even number of bits (even parity), only one of which is a check bit, and each bit of each code word is a member of an odd number of code groups. At the receiver, a single correctable error is assumed to have occurred if an odd number of received code groups contains an odd number of bits (odd parity) and an uncorrectable double error is assumed to have occurred if an even number of code groups have odd parity. Single errors are then located and corrected as an AND function of the odd parity code groups. The check bit generator, error detector and error locator are designed in accordance with a technique for using a minimum number of components and a uniform number of components in each parallel signal path. Among the design goals are: each unique code group should substantially contain the same number of bits, each information bit must be a member of an odd number of code groups greater than one, and each check bit must be a member of a different code group. The number of code groups to which each information bit is assigned is determined by first exhausting the lowest odd number of code group combinations available before going to the next odd number of combinations.

INVENTORS
MU-YUE HSIAO
EUGENE KOLANKOWSKY

BY Frank A. Hauptman

ATTORNEY

CHECK BIT GENERATOR 2 / ERROR DETECTOR 5

OPTIMUM APPARATUS AND METHOD FOR CHECK BIT GENERATION AND ERROR DETECTION, LOCATION AND CORRECTION

BACKGROUND OF THE INVENTION

1. Field of the Invention

The invention pertains to error detection and correction in data communication and processing systems, and particularly to an improved check bit generation, error detection and correction scheme wherein optimum design permits the circuitry to be greatly simplified.

2. Description of the Prior Art

In the prior art, given the need to transfer information bits (for example, D0, D1 and D2) between two points, there have been proposed many techniques for detecting and correcting errors in the data bits. These techniques are explained in any of a number of textbooks in the field, for example: *Error Detecting Logic for Digital Computers* by Frederick F. Sellers, Jr., Mu-Yue Hsiao and Leroy W. Bearnson (McGraw Hill 1968); and *Error Correcting Codes* by W. Wesley Peterson (The M.I.T. Press 1961). Typically, check bits are carried along with the information bits for indicating the occurrence, and location, of errors in both the information bits and the check bits. In the well known Hamming Code, (see, for example, Reissue Pat. No. 23,601, "Error-Detecting and Correcting System" Richard W. Hamming et al., assigned to Bell Telephone Laboratories) each check bit and preselected information bits form a code group, the value of each check bit being determined by the value of the information bits in its code group. Therefore, any change in either an information bit or a check bit during transmission will be identifiable at the receiving end. Table I illustrates a simplified 6-bit single error correcting and single error detecting (SEC/SED) code wherein three check bits C1, C2 and C3 are assigned values as a function of three information bits D0, D1 and D2.

TABLE I.—PRIOR ART
Hamming SEC/SED (6,3) code

| | *k* information bits | | | (*n*–*k*) check bits | | |
|---|---|---|---|---|---|---|
| | D0 | D1 | D2 | C1 | C2 | C3 |
| S1 | | | | 1 | 0 | 0 |
| S2 | | | | 0 | 1 | 0 |
| S3 | | | | 0 | 0 | 1 |

The total number of bits in the code word are *n*, there are *k* information bits, *n*–*k* (also called *r*) check bits and the code is specified as (*n*,*k*). Referring to table II, check bits C1 and information bits D0 and D2 form code group S1.

TABLE II.—PRIOR ART
Hamming SEC/SED (6,3) code

| | D0 | D1 | D2 | C1 | C2 | C3 |
|---|---|---|---|---|---|---|
| S1 | 1 | 0 | 1 | 1 | 0 | 0 |
| S2 | 1 | 1 | 1 | 0 | 1 | 0 |
| S3 | 0 | 1 | 1 | 0 | 0 | 1 |

The relationships of the check bits and information bits represented by the matrix are subject to the rules that: each code group must contain at least one check bit, each information bit must be a member of at least one code group and each code group must contain unique sets of information bits and check bits. The relationships dictate Exclusive OR functions, each information bit one in the matrix representing an input and each check bit one representing an output. For example, assuming even parity, check bit C1 is one if there is a one in either position D0 or D2, and is zero if there is a one in both or neither positions. Odd parity would give opposite values to C1. Stated another way, check bit C1 is equal to the Exclusive OR of D0 and D2 for even parity. Similarly, check bit C2 is equal to the Exclusive OR of D0, D1 and D2. Typically, each code group contains more than one check bit.

If a single error occurs in the transmission of information contained in the code word comprising bits D0, D1, D2, C1, C2 and C3, the error will be reflected as a variance between the expected parity of each code group and the parity of the code group received. This variance results from an error which can be located in the received word in accordance with an analysis of the information received, as shown with reference to table III.

TABLE III.—PRIOR ART

| | D0 | D1 | D2 | C1 | C2 | C3 | Syndrome |
|---|---|---|---|---|---|---|---|
| S1 | 1 | 0 | 1 | 1 | 0 | 0 | 1 |
| S2 | 1 | 1 | 1 | 0 | 1 | 0 | 1 |
| S3 | 0 | 1 | 1 | 0 | 0 | 1 | 0 |

The analysis is made by examining each code group for accuracy (even parity) and then deriving the erroneous bit location. The examination of a code group indicates a "syndrome," a one indicating that that code group's parity is incorrect. For example, a fault effecting information bit D0 causes an S1, S2 and $\overline{S3}$ syndrome (parity errors in code groups S1 and S2). Since information bit D0 is the only bit effecting code groups S1 and S2 and not S3, it is the incorrect bit.

While the foregoing has assumed single error correction and single error detection, double error detection is desirable. In the prior art this can be achieved by the addition of an additional check bit CT which examines the overall parity of all bits in the code word, as shown in table IV.

TABLE IV.—PRIOR ART
Hamming SEC/DED (7,3) code

| | D0 | D1 | D2 | C1 | C2 | C3 | CT |
|---|---|---|---|---|---|---|---|
| S1 | 1 | 0 | 1 | 1 | 0 | 0 | 0 |
| S2 | 1 | 1 | 1 | 0 | 1 | 0 | 0 |
| S3 | 0 | 1 | 1 | 0 | 0 | 1 | 0 |
| ST | 1 | 1 | 1 | 1 | 1 | 1 | 1 |

Without the extra CT bit, any two errors in a code group (for instance, an error in bits D0 and C1) would leave even parity in that code group, but not necessarily in others, and thus indicate the error location incorrectly. The additional CT bit identifies this (uncorrectable) condition by indicating that the overall parity has not changed even though one or more code groups do detect a change.

In constructing check bit generating circuits, each information bit "one" in the information bit matrix represents one input leg of an Exclusive OR circuit and each check bit "one" represents an output. In the case of error checking circuits, each "one" represents a leg of an Exclusive OR circuit, and the error locating circuit requires still additional circuits. Even assuming the availability of Exclusive OR circuits with more than two inputs, it can be seen that a large number of circuits must be provided and, further, that some signals inefficiently travel substantially longer paths than others, the speed of operation being determined by the longest path. The overall check bit CT is a major complicating factor because it contains only "ones" requiring many inputs and a long signal path.

SUMMARY OF THE INVENTION

The present invention efficiently achieves the advantages of the prior art with substantially less connections and circuits. In the improved circuit, illustrated by a matrix of the type shown in table V, a fourth uniquely positioned check bit C4 is provided for monitoring an arbitrary number of information bits (shown, for example, to be D0 and D1 in code group S4) which is chosen to place each information and check bit in an odd number (1, 3, 5, 7, etc.) of code groups.

TABLE V

SEC/DED (7,3) Code

| | D0 | D1 | D2 | C1 | C2 | C3 | C4 |
|---|---|---|---|---|---|---|---|
| S1 | 1 | 0 | 1 | 1 | 0 | 0 | 0 |
| S2 | 1 | 1 | 1 | 0 | 1 | 0 | 0 |
| S3 | 0 | 1 | 1 | 0 | 0 | 1 | 0 |
| S4 | 1 | 1 | 0 | 0 | 0 | 0 | 1 |

By monitoring all four code groups S1 through S4 for even parity, the resulting syndrome (containing one or more odd parities) indicates one or more errors. Since each information and check bit is assigned to an odd number of code groups, a single (or other odd) error is indicated by an odd number of code group parity indications and a double (or other even) error by an even number. Further, single errors can be easily located by decoding syndromes in accordance with their common bit assignments. For example, since an error in bit position D0 causes an S1, S2, $\overline{S3}$, S4 syndrome (even parities detected by code groups S1, S2 and S4), one AND circuit can be activated by signals indicating even parities for code groups S1, S2 and S4 (and, if desired, an odd parity for S3) to identify bit D0 as the bit needing correction.

The exact choice of bit assignments is important. Table VI shows a choice of assignments that may be made for a (22,16) SEC/DED code.

While some essential rules were stated with regard to the prior art, optimum design entails additional rules. The first additional rule is that each information and check bit be assigned to an odd number of code groups. This odd number is one for check bits and more than one for information bits. System architectural considerations aside, information bits are assigned to all available combinations of three code groups first, all available combinations of five code groups next, etc. Breach of this rule is illustrated in table VI by the assignment of bit D0 to five code groups even though only 15 of the 20 available combinations of three code groups have been used. The circuit represented by the matrix of table VI can be optimized (to reduce the number of inputs by two) by substituting one of the unused combinations of three in the D0 column. In doing this, however, an additional consideration is the number of Exclusive OR levels traveled in generating and detecting each code group—a substantially equal number of ones for each code group being desirable. Code groups S4 and S5 contain ten ones (three levels of three input Exclusive OR's) and code groups S1 through S3 and S6 contain nine ones (two levels). Thus optimum design involves both equalizing the number of ones in each row and utilizing the available permutations of three. This is shown in table VII where an optimum circuit is represented because each code group requires two levels of 3-input Exclusive OR's and only combinations of three are used.

DESCRIPTION OF THE PREFERRED EMBODIMENT

General Description

Figure 1:
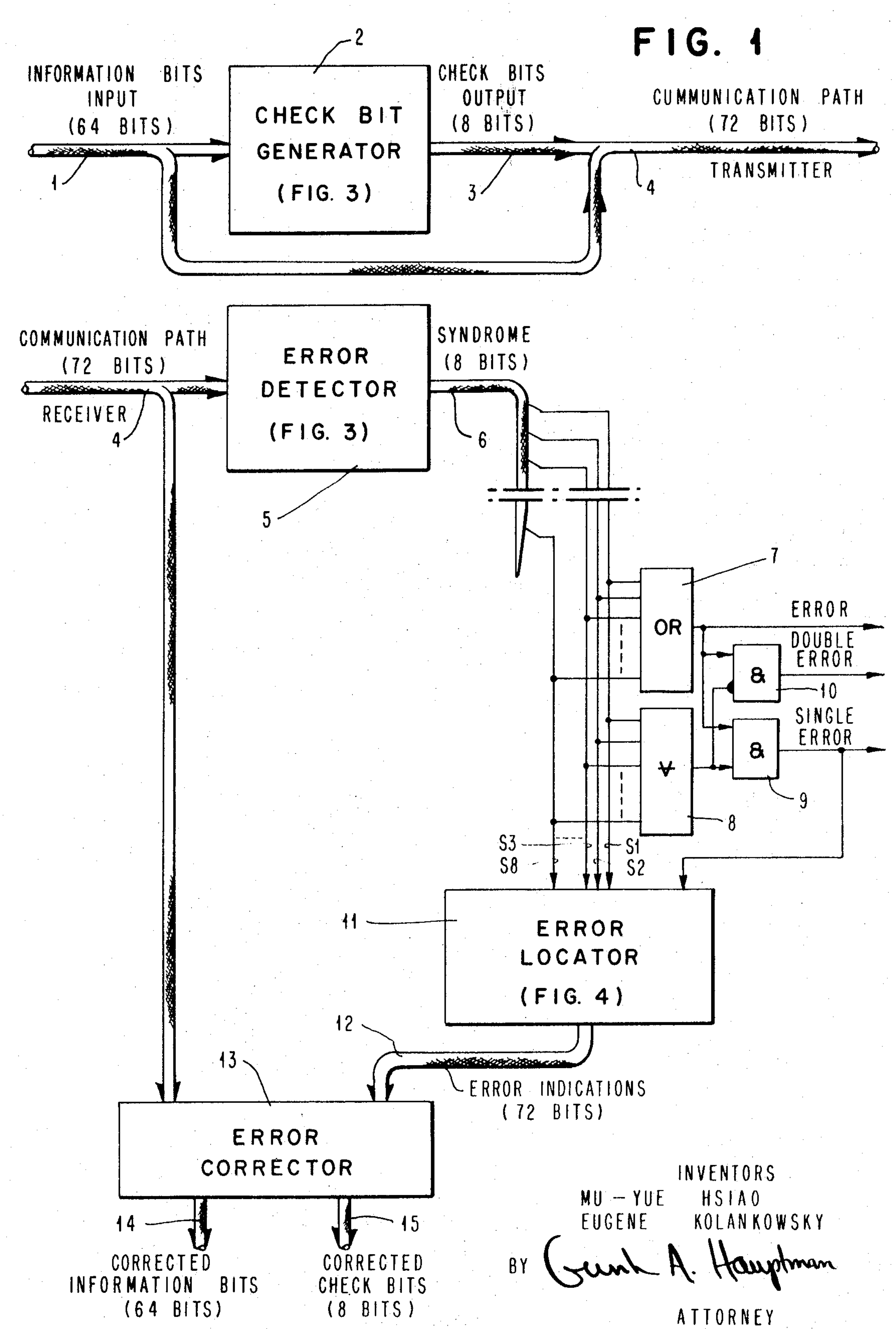
FIG. 1 is a block diagram showing a system embodying the invention.

Referring to FIG. 1, 64 information bits D0 through D63 present on the input bus 1 are made available to a check bit generator 2 which places eight check bits C1 through C8 on output bus 3, communication path 4 then transmitting all 72 bits as a code word. At the receiver, the 72 bit code word on the communication path 4 is supplied to an error detector 5 which generates eight syndrome bits S1 through S8 representative of eight code groups S1 through S8 within the 72 bit code word. The eight syndrome bits are used to detect the presence of a single error or a double error and to locate the position of a single error. One or more signals on the eight syndrome lines cause OR-circuit 7 to place a signal on the error line. An odd number of signals on the eight syndrome lines, indicating a single (or odd) number of errors, is detected by an Exclusive OR-circuit 8 which is gated to the single error line via AND-circuit 9 when OR-circuit 7 indicates that an error has occurred. If upon operation of the OR-circuit 7, an even number of signals is present on the syndrome lines, AND-circuit 10 is activated by the inhibit (inverted) input from the Exclusive OR-circuit 8 to place a signal on the double error output line. The syndrome signal lines S1 through S8 are also made available to an error locator 11 which supplies error indications D0′ through D63′ and C1′ through C8′ on 72 error indication lines 12 to an error corrector 13. The error corrector 13 combines corresponding error indications and code word positions to supply corrected information bits on bus 14 and corrected check bits on bus 15.

The general construction of the system of FIG. 1 will be explained further with reference to the matrix of FIG. 2 which symbolically represents the check bit generator 2, the error detector 5 and the error locator 11. The matrix columns show the 72 bit code word divided into 64 information bits D0 through D63 and eight check bits C1 through C8 and further divided into nine equal sections (bytes) B1 through "check"

TABLE VI

| | D0 | D1 | D2 | D3 | D4 | D5 | D6 | D7 | D8 | D9 | D10 | D11 | D12 | D13 | D14 | D15 | C1 | C2 | C3 | C4 | C5 | C6 | |
|---|---|---|---|---|---|---|---|---|---|---|---|---|---|---|---|---|---|---|---|---|---|---|---|
| S1---------- | 1 | 1 | 1 | 1 | 1 | 1 | 0 | 0 | 0 | 0 | 1 | 0 | 0 | 0 | 1 | 0 | 1 | 0 | 0 | 0 | 0 | 0 | 9 |
| S2---------- | 1 | 1 | 1 | 0 | 0 | 0 | 1 | 1 | 1 | 1 | 0 | 0 | 1 | 0 | 0 | 0 | 0 | 1 | 0 | 0 | 0 | 0 | 9 |
| S3---------- | 1 | 0 | 0 | 0 | 1 | 0 | 1 | 1 | 1 | 0 | 0 | 0 | 0 | 1 | 1 | 1 | 0 | 0 | 1 | 0 | 0 | 0 | 9 |
| S4---------- | 1 | 0 | 0 | 0 | 0 | 1 | 1 | 0 | 0 | 1 | 1 | 1 | 0 | 1 | 1 | 1 | 0 | 0 | 0 | 1 | 0 | 0 | 9 |
| S5---------- | 1 | 1 | 0 | 1 | 0 | 0 | 0 | 1 | 0 | 1 | 1 | 1 | 1 | 1 | 0 | 0 | 0 | 0 | 0 | 0 | 1 | 0 | 9 |
| S6---------- | 0 | 0 | 1 | 1 | 1 | 1 | 0 | 0 | 1 | 0 | 0 | 1 | 1 | 0 | 0 | 1 | 0 | 0 | 0 | 0 | 0 | 1 | 9 |

TABLE VII

| | D0 | D1 | D2 | D3 | D4 | D5 | D6 | D7 | D8 | D9 | D10 | D11 | D12 | D13 | D14 | D15 | C1 | C2 | C3 | C4 | C5 | C6 | |
|---|---|---|---|---|---|---|---|---|---|---|---|---|---|---|---|---|---|---|---|---|---|---|---|
| S1---------- | 1 | 1 | 1 | 1 | 1 | 1 | 0 | 0 | 0 | 0 | 1 | 0 | 0 | 0 | 1 | 0 | 1 | 0 | 0 | 0 | 0 | 0 | 9 |
| S2---------- | 1 | 1 | 1 | 0 | 0 | 0 | 1 | 0 | 1 | 1 | 0 | 0 | 1 | 0 | 0 | 0 | 0 | 1 | 0 | 0 | 0 | 0 | 9 |
| S3---------- | 1 | 0 | 0 | 0 | 1 | 0 | 1 | 1 | 1 | 0 | 0 | 0 | 0 | 1 | 1 | 1 | 0 | 0 | 1 | 0 | 0 | 0 | 9 |
| S4---------- | 0 | 0 | 0 | 0 | 0 | 1 | 1 | 0 | 0 | 1 | 1 | 1 | 0 | 1 | 1 | 1 | 0 | 0 | 0 | 1 | 0 | 0 | 10 |
| S5---------- | 0 | 1 | 0 | 1 | 0 | 0 | 0 | 1 | 0 | 1 | 1 | 1 | 1 | 1 | 0 | 0 | 0 | 0 | 0 | 0 | 1 | 0 | 10 |
| S6---------- | 0 | 0 | 1 | 1 | 1 | 1 | 0 | 0 | 1 | 0 | 0 | 1 | 1 | 0 | 0 | 1 | 0 | 0 | 0 | 0 | 0 | 3 | 9 |

of eight bits each (for architectural reasons to be discussed below). Each one of the check bits C1 through C8 belongs to a different one of eight code groups S1 through S8 indicated in the matrix as rows S1 through S8. Each one bit in the matrix represents a physical circuit connection. In the check bit generator 2, each one of the check bits C1 through C8 is the Exclusive OR function of all the information bits indicated by one bits in that check bit's row. For example, check bit C1 is the Exclusive OR of information bits D0 through D7, D20, etc. Similarly, check bit C2 is formed by Exclusive ORing information bits D0, D1, D2, D5, etc. In the error detector 5, a similar Exclusive OR operation is performed on each code group, however, including the check bits. For example, for code group S1, an Exclusive OR operation is performed upon information bits D0 through D7, D20, etc., and check bit C1. Since the check bit generator 2 assigns check bits C1 through C8 to give an even number of ones in each code group (even parity), the error detector 5 recognizes, if there is no error, that the even parity has remained unchanged. However, if there is an error, one or more of the eight code groups will have odd parity causing syndrome signals on corresponding ones of lines S1 through S8 in FIG. 1. The interpretation of these syndromes by the error locator 11 is also represented by the matrix of FIG. 2. An error in an information bit or a check bit position (matrix column) effects predetermined code groups (matrix rows) S1 through S8. For example, an error in information bit D0 will cause code groups S1, S2 and S4 to have odd parity which is reflected by one bit syndrome signals from the error detector 5 on lines S1, S2 and S4. Error location is accomplished if one AND circuit is provided for each code word bit (matrix column) with inputs from each syndrome line for the code group to which it belongs (one bits in its matrix column). This is illustrated in FIG. 2, by the numbers underneath the matrix. For example, since syndrome S1, S2 and S4 is caused by an error in bit D0, the output of an AND circuit is caused by a coincidence of inputs S1, S2 and S4 and "single error." An additional input $\overline{S5}$ is provided to insure proper error decoding to distinguish overlapping syndrome subsets.

Figure 2:
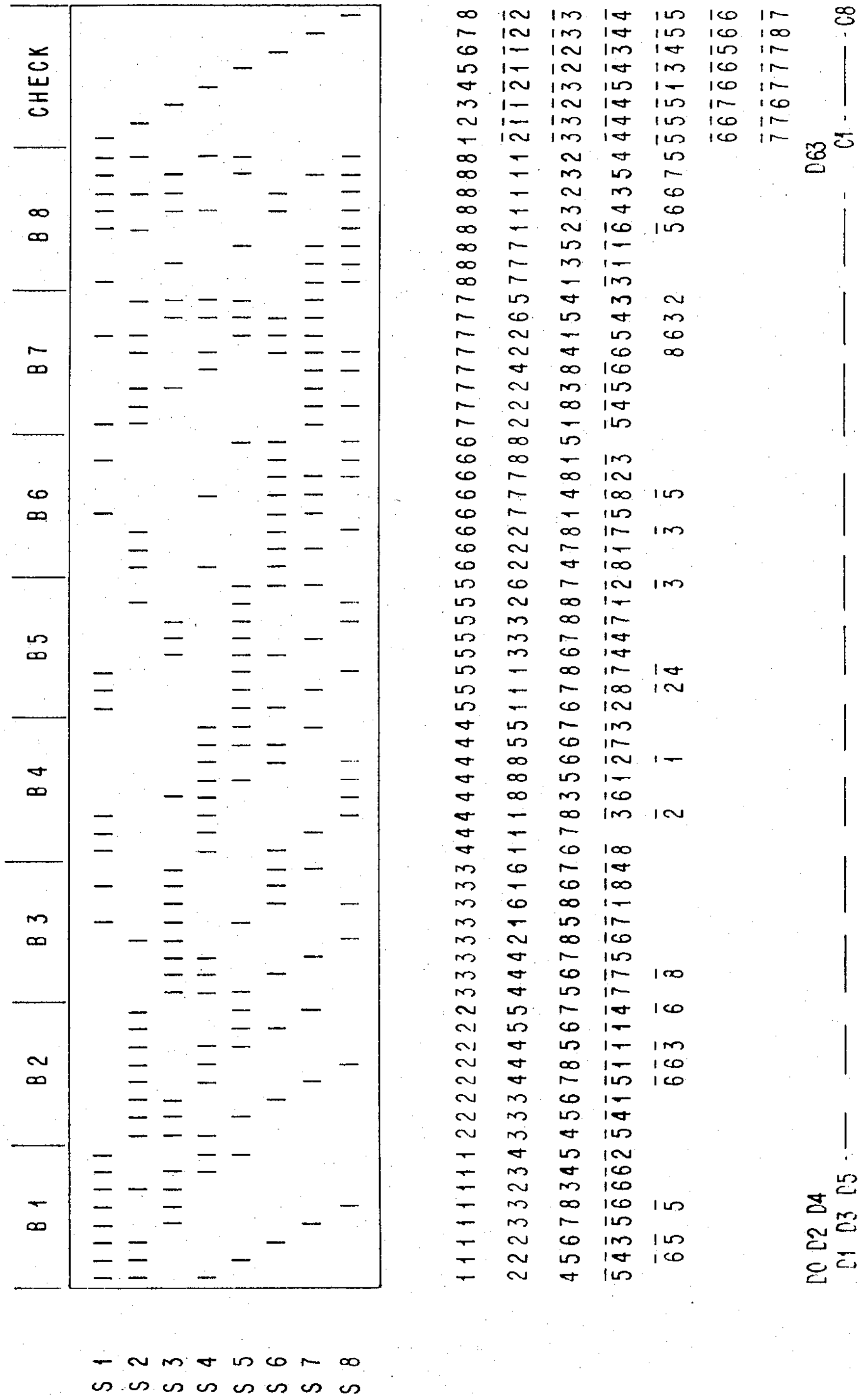
FIG. 2 is a diagram of a matrix illustrating the interconnections provided within the check bit generator, error detector and error locator of FIG. 1.

Inasmuch as the one bits in the matrix of FIG. 2 determine the circuits for implementing check bit generation and error detection, location and correction, the less ones there are in the matrix, the less circuitry is required to construct the system. Optimization, however, involves additional considerations. Each syndrome signal S1 through S8 is generated by a number of levels of Exclusive OR circuits determined by the number of inputs provided for each actual circuit. For example, if each Exclusive OR circuit has three inputs, the maximum number of levels traversed by syndrome signal S1 can be calculated as three in accordance with the relationship:

No. of levels=$\log_v t_i$, where $v$ is the number of inputs to each Exclusive OR circuit and $t_i$ is the total number of inputs for that syndrome. (In the case of a fractional part the next largest integer is chosen.)

The speed of operation of the check bit generator 2 and error detector 5 is determined by the longest path traveled by the input signals through successive levels of Exclusive ORs. Therefore, in addition to minimizing the total number of ones in the matrix, it is necessary to equalize the number of ones in each row of the matrix.

Additional criteria used in designing the matrix include rules inherent in SEC/DED codes, that is: each group must contain at least one check bit, each information bit must be a member of at least one code group and each code group must contain unique sets of information bits and check bits. Additional criteria are essential to the invention disclosed herein. First it is necessary that each information and check bit belong to an odd number of code groups S1 through S8. In the case of check bits, it is necessary that this number be one and in the case of information bits it is necessary that this number be greater than one. The manner of choosing how many code groups a particular information will belong to is also essential. Except for architectural considerations, of the type to be illustrated below, membership in code groups is chosen by exhausting each odd number of combinations of the code groups, starting with the smallest odd number. For the matrix of FIG. 2, the check bits are assigned by taking the eight rows one at a time. Next, all combinations of the eight rows taken three at a time must be exhausted before any bits are assigned to five rows, etc., the number of combinations of $r$ things taken $m$ at a time is:

$$\binom{r}{m}=\frac{r(r-1)\ldots(r-m+1)}{1\cdot 2\ldots m}.$$

Thus, for $m$=3, 56 information bits must be assigned to three code groups each before any are assigned to five code groups. The last assignment approaches, but does not equal, $$\binom{r}{r}$$

The matrix of FIG. 2 illustrates an optimum configuration taking account of these criteria plus an additional architectural consideration which is based upon the division of the 72 bit code word into nine equal eight-bit bytes B1, B2, etc. through "check." The byte divisions facilitate arithmetic and logic operations in data processing systems which treat sections of code words. Such systems perform additional parity checks upon each byte, entailing an Exclusive OR operation on all bits of the byte. It is therefore efficient to utilize the existing byte parity circuit as part of the code word circuit, as shown for byte B1 by providing eight one bits in code group S1, in byte B2 by providing eight bits in code group S2, etc. Once these eight bits are provided as shown in FIG. 2, the above criteria are applied to give an optimum hardware configuration.

While FIG. 2 illustrates one (72,64) code, the same criteria may be applied to design other matrices for this code. Two different versions of parity check matrices for a (72,64) SEC/DED code are shown in tables VIII and IX.

A circuit constructed in accordance with the matrices of tables VII–IX have a greater probability of detecting triple error than the conventional Hamming code. The criteria may also be applied to other codes. Table X illustrates the total number of ones in the matrix (column B) and the average number of ones in each row (column C) for some other codes comprehended by the invention; others will occur to those skilled in the art.

The odd combinations $$\binom{r}{m}$$

used for each code are indicated in column A. Column D indicates the minimum number of levels.

Detailed Description

Figure 3:
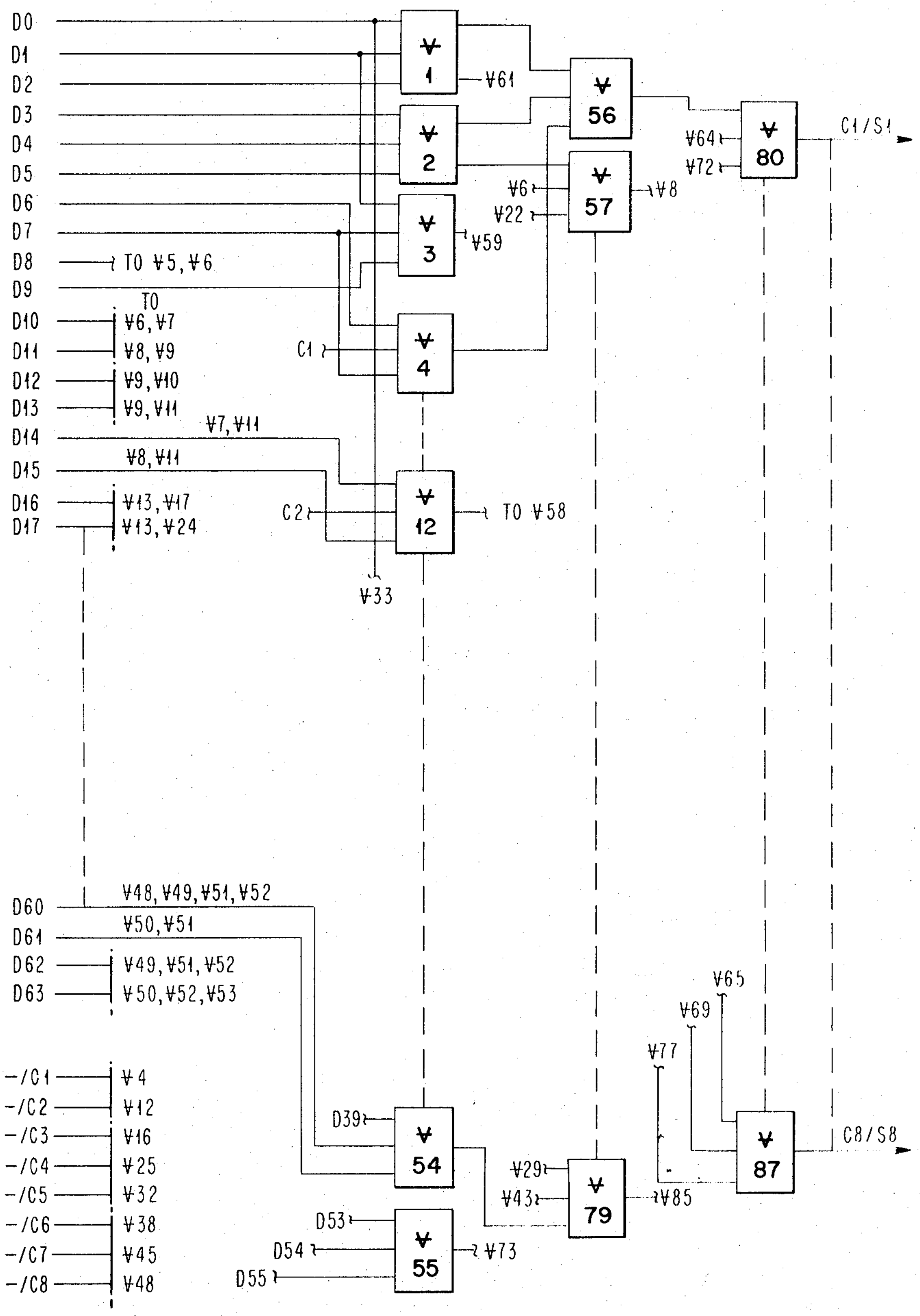
FIG. 3 is a logic diagram showing an embodiment of the error detector and a check bit generator.

Referring now to FIG. 3, the check bit generator 2 and the error detector 5 will be described. Since the two devices are similar, FIG. 3 represents both, the D input legends and C output legends being used in one circuit and the D and C input legends and S output legends for the other. The check bit generator 2 monitors the information bits D0 through D63 to generate check bits C1 through C8. Exclusive OR circuits $\veebar$1 through $\veebar$55 form a first level, circuits $\veebar$56 through $\veebar$79 a second level and $\veebar$80 through $\veebar$87 a third level. The total number of Exclusive OR circuits provided is determined by the number of ones in the matrix of FIG. 2. Table X shows that for a (72,64) code, there are 216 ones in the matrix, falling into eight rows of 27 ones each. For three-input Exclusive OR circuits, 87 separate circuits are required to generate all syndrome bits in the three levels. For example, Exclusive OR-circuit $\veebar$1 receives three information bit inputs D0, D1 and D2 corresponding to the first three bits D0, D1, D2 in row S1 of the matrix of FIG. 2. The output of Exclusive OR $\veebar$1 is supplied to Exclusive OR $\veebar$56, which also receives a signal from Exclusive OR $\veebar$2 (connected to bits D3, D4 and D5) and from Exclusive OR $\veebar$4 (connected to inputs D6 and D7). Ultimate-

TABLE VIII

| BYTE | 1 | | | | | | | | 2 | | | | | | | | 3 | | | | | | | | 4 | | | | | | | | 5 | | | | | | | | 6 | | | | | | | | 7 | | | | | | | | 8 | | | | | | | | CHECK | | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| BIT | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 | 61 | 62 | 63 | $C_1$ | $C_2$ | $C_3$ | $C_4$ | $C_5$ | $C_6$ | $C_7$ | $C_8$ | |
| S1 |1|1|1|1|1|1|1|1| | |1| | |1|1| | |1| | |1| | |1|1| | |1| | | | | | | |1| | | | | | | |1| | |1|1| | | |1|1|1| | |1|1|1| | | | | |1| | | | | | | | 27 |
| S2 |1|1|1| | | | | |1|1|1|1|1|1|1|1| | |1| | |1|1| | |1| | |1| | |1|1| | |1| | | | | | | |1| | | | | | | |1| | |1|1| | | |1|1|1| | | |1| | | | | | | 27 |
| S3 | | | |1|1|1| | |1|1|1| | | | | |1|1|1|1|1|1|1|1| | |1| | |1|1| | |1| | |1| | |1|1| | |1| | | | | | | |1| | | | | | | |1| | |1|1| | |1| | | | | | 27 |
| S4 | | | |1| | |1|1| | | |1|1|1| | |1|1|1| | | | | |1|1|1|1|1|1|1|1| | |1| | |1|1| | |1| | |1| | |1|1| | |1| | | | | | | |1| | | | | | | |1| | | | | 27 |
| S5 | | | |1| | | | | | | |1| | |1|1| | | |1|1|1| | |1|1|1| | | | | |1|1|1|1|1|1|1|1| | |1| | |1|1| | |1| | |1| | |1|1| | |1| | | | | | | | |1| | | | 27 |
| S6 |1| | |1| | | | | | | |1| | | | | | | |1| | |1|1| | | |1|1|1| | |1|1|1| | | | | |1|1|1|1|1|1|1|1| | |1| | |1|1| | |1| | |1| | |1| | | | | |1| | | 27 |
| S7 | |1| | |1| | |1|1| | |1| | | | | | | |1| | | | | | | |1| | |1|1| | | |1|1|1| | |1|1|1| | | | | |1|1|1|1|1|1|1|1| | |1| | |1|1| | | | | | | |1| | 27 |
| S8 | | |1| | |1|1| | |1| | |1| | |1|1| | |1| | | | | | | |1| | | | | | | |1| | |1|1| | | |1|1|1| | |1|1|1| | | | | |1|1|1|1|1|1|1|1| | | | | | | |1| 27 |

TABLE IX

| BYTE | 1 | | | | | | | | 2 | | | | | | | | 3 | | | | | | | | 4 | | | | | | | | 5 | | | | | | | | 6 | | | | | | | | 7 | | | | | | | | 8 | | | | | | | | CHECK | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| BIT | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 | 61 | 62 | 63 | $C_1$ | $C_2$ | $C_3$ | $C_4$ | $C_5$ | $C_6$ | $C_7$ | $C_8$ |
| S1 |1|1|1|1|1|1|1|1| | | | |1|1|1|1| | | | |1|1|1|1| | | | |1|1| | | |1|1| |1| | | |1| | | |1| | | |1| | | |1| | | |1| | | | | | | |1| | | | | | | |
| S2 |1|1|1|1| | | | |1|1|1|1|1|1|1|1| | | | | | | | |1|1|1|1| | |1|1| |1|1| | |1| | | |1| | | |1| | | |1| | | |1| | | |1| | | | | | | |1| | | | | | |
| S3 | | |1|1| | | | |1|1|1|1| | | | |1|1|1|1|1|1|1|1| | | | |1|1|1|1| | | | | | |1| | | |1| | | |1| | | |1| | | |1| | | |1| | |1|1| | | |1| | | | | |
| S4 |1|1| | |1|1|1|1| | | | | | | | |1|1|1|1| | | | |1|1|1|1|1|1|1|1| | | | | | | |1| | | |1| | | |1| | | |1| | | |1| | | |1| |1|1| | | | |1| | | | |
| S5 | |1|1| |1| | | |1| | | |1| | | |1| | | |1| | | |1| | | | | | | |1|1|1|1|1|1|1|1| | | | |1|1|1|1| | | | | | | | |1|1|1|1| | |1|1| | | | |1| | | |
| S6 | |1|1| | |1| | | |1| | | |1| | | |1| | | |1| | | |1| | | | | | |1|1|1|1| | | | |1|1|1|1|1|1|1|1| | | | |1|1|1|1| | | | |1|1| | | | | | | |1| | |
| S7 | | | | | | |1| | | |1| | | |1| | | |1| | | |1| | | |1| | |1|1| |1|1| | |1|1|1|1| | | | | | | | |1|1|1|1|1|1|1|1| | | | |1|1|1|1| | | | | | |1| |
| S8 | | | | | | | |1| | | |1| | | |1| | | |1| | | |1| | | |1| |1|1| | | |1|1| | | | |1|1|1|1| | | | |1|1|1|1| | | | |1|1|1|1|1|1|1|1| | | | | | | |1|

ly, Exclusive OR circuit V80 supplies a check signal C1 as a function of all information bits indicated by ones in row S1 of the matrix. The choice of a three input Exclusive OR circuit is arbitrary, the more commonly two input Exclusive OR circuits being usable, in which case more Exclusive OR circuits would be required. Some inputs to the Exclusive OR circuits for example, inputs to Exclusive OR circuits V4 and V12 are not used in the check bit generator 2.

TABLE X

| n | k | r | A: Structure of H $\binom{r}{1}$ $\binom{r}{3}$ $\binom{r}{5}$ . . . | B: Total number of 1's in H | C: Average number of 1's, A. in H (for rows) | D: $l_{s_i}(\geq l_{c_i})$ |
|---|---|---|---|---|---|---|
| 12 | 8 | 4 | $\binom{4}{1}+\binom{4}{3}$ | 16 | 4 | $[\log_2 4]$ |
| 14 | 9 | 5 | $\binom{5}{1}+9/\binom{5}{3}$* | 32 | 6.4 | $[\log_2 7]$ |
| 15 | 10 | 5 | $\binom{5}{1}+\binom{5}{3}$ | 35 | 7 | $[\log_2 7]$ |
| 16 | 11 | 5 | $\binom{5}{1}+\binom{5}{3}$ $+\binom{5}{5}$ | 40 | 8 | $[\log_2 8]$ |
| . . . | . . . | . . . | | | | |
| 22 | 16 | 6 | $\binom{6}{1}+16/\binom{6}{3}$ | 54 | 9 | $[\log_2 9]$ |
| . . . | . . . | . . . | | | | |
| 26 | 20 | 6 | $\binom{6}{1}+\binom{6}{3}$ | 66 | 11 | $[\log_2 11]$ |
| . . . | . . . | . . . | | | | |
| 30 | 24 | 6 | $\binom{6}{1}+\binom{6}{3}$ $+4/\binom{6}{5}$ | 86 | 14.3 | $[\log_2 15]$ |
| . . . | . . . | . . . | | | | |
| 39 | 32 | 7 | $\binom{7}{1}+32/\binom{7}{3}$ | 103 | 14.7 | $[\log_2 15]$ |
| . . . | . . . | . . . | | | | |
| 43 | 36 | 7 | $\binom{7}{1}+\binom{7}{3}$ $+1/\binom{7}{5}$ | 117 | 16.7 | $[\log_2 17]$ |
| . . . | . . . | . . . | | | | |
| 47 | 40 | 7 | $\binom{7}{1}+\binom{7}{3}$ $+9/\binom{7}{5}$ | 157 | 22.4 | $[\log_2 23]$ |
| . . . | . . . | . . . | | | | |
| 55 | 48 | 7 | $\binom{7}{1}+\binom{7}{3}$ $+13/\binom{7}{5}$ | 177 | 25.3 | $[\log_2 26]$ |
| . . . | . . . | . . . | | | | |
| 72 | 64 | 8 | $\binom{8}{1}+\binom{8}{3}$ $+8/\binom{8}{5}$ | 216 | 27 | $[\log_2 27]$ |
| . . . | . . . | . . . | | | | |
| 80 | 72 | 8 | $\binom{8}{1}+\binom{8}{3}$ $+16/\binom{8}{5}$ | 256 | 32 | $[\log_2 32]$ |
| . . . | . . . | . . . | | | | |
| 88 | 80 | 8 | $\binom{8}{1}+\binom{8}{3}$ $+24/\binom{8}{5}$ | 296 | 37 | $[\log_2 37]$ |
| . . . | . . . | . . . | | | | |
| 96 | 88 | 8 | $\binom{8}{1}+\binom{8}{3}$ $+32/\binom{8}{5}$ | 336 | 42 | $[\log_2 42]$ |
| . . . | . . . | . . . | | | | |
| 104 | 96 | 8 | $\binom{8}{1}+\binom{8}{3}$ $+40/\binom{8}{5}$ | 376 | 47 | $[\log_2 47]$ |
| . . . | . . . | . . . | | | | |
| 112 | 104 | 8 | $\binom{8}{1}+\binom{8}{3}$ $+48/\binom{8}{5}$ | 416 | 52 | $[\log_2 52]$ |
| . . . | . . . | . . . | | | | |
| 120 | 112 | 8 | $\binom{8}{1}+\binom{8}{3}$ $+\binom{8}{5}$ | 456 | 57 | $[\log_2 57]$ |
| . . . | . . . | . . . | | | | |
| 128 | 120 | 8 | $\binom{8}{1}+\binom{8}{3}$ $+\binom{8}{5}+\binom{8}{7}$ | 512 | 64 | $[\log_2 64]$ |
| 130 | 121 | 9 | $\binom{9}{1}+\binom{9}{3}$ $+37/\binom{9}{5}$ | 446 | 51.7 | $[\log_2 52]$ |
| . . . | . . . | . . . | | | | |
| 137 | 128 | 9 | $\binom{9}{1}+\binom{9}{3}$ $+44/\binom{9}{5}$ | 481 | 53.4 | $[\log_2 54]$ |
| . . . | . . . | . . . | | | | |
| etc. | | | | | | |

*The notation $j/\binom{r}{i}$ implies that $j$ out of all possible $\binom{r}{i}$ combinations is used.

The error detector 5 is similar in construction to the check bit generator 2, except that it receives both the information bits D0 through D63 and the check bits C1 through C8 and determines whether even parity has been maintained with respect to each code group. Syndrome signals on lines S1 through S8 indicate whether odd or even parity for the corresponding code group has occurred. Exclusive OR circuits V1 through V87 are connected similarly to the check bit generator 2 except that the legs of Exclusive OR circuits unused in that circuit are connected to the inputs C1 through C8 for the error detector 5. These connections are determined by the one bits in the check bit portions C1 through C8 of the matrix of FIG. 2, each being connected to one of the Exclusive OR circuits.

Figure 4:
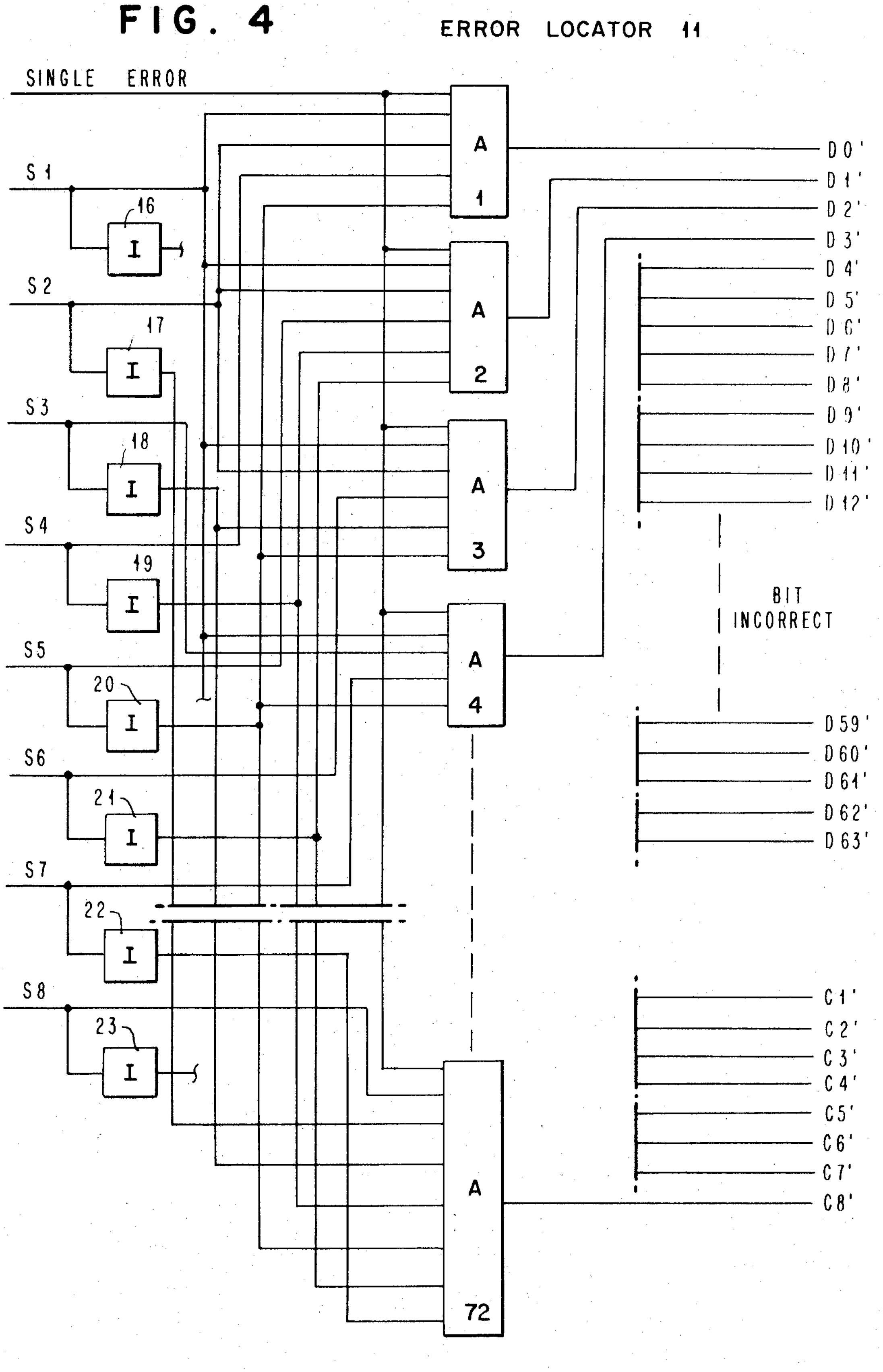
FIG. 4 is a logic diagram showing an embodiment of the error locator.

Referring now to FIG. 4, the error locator 11 will be described. The error locator monitors the syndrome signals S1 through S8 which indicate by one bits if the corresponding code group has odd parity. The error locator 11 places a signal on a "bit incorrect" line D0′ through D63′ and C1′ through C8′, to indicate that the information or check bit corresponding to that line is incorrect and must be corrected. The error locator 11 comprises 72 AND-circuits A1 through A72 corresponding to the 72 columns of the matrix in FIG. 2. For example, AND-circuit A1 receives inputs from lines S1, S2, and S4 and single error to place a signal on the D0′ line. An additional input is provided on line $\overline{S5}$ to prevent erroneous operation in the absence of a signal, inverse signals $\overline{S1}$ through $\overline{S8}$ are provided by inverters 16 through 23. It is not necessary to provide multi-input AND circuits of the type shown, two input AND circuits being usable, for example, additional levels and/or circuits are provided.

Example of Operation

The operation of the invention will now be described with reference to the FIGURES and the following table.

TABLE XI

| I | D0 | D1 | D2 | D3 | D4 | D5 | D6 | D7 | . . . | D63 | C1 | C2 | C3 | C4 | C5 | C6 | C7 | C8 |
|---|---|---|---|---|---|---|---|---|---|---|---|---|---|---|---|---|---|---|
| II | D0′ | D1′ | D2′ | D3′ | D4′ | D5′ | D6′ | D7′ | . . . | D63′ | C1′ | C2′ | C3′ | C4′ | C5′ | C6′ | C7′ | C8′ |
| III | | | | | | | | | | | S1 | S2 | S3 | S4 | S5 | S6 | S7 | S8 |
| I Bus 1 | 1 | 0 | 1 | 0 | 1 | 0 | 1 | 0 | . . . | 0 | 0 | 0 | 0 | 0 | 0 | 0 | 0 | 0 |
| I Bus 3 | 0 | 0 | 0 | 0 | 0 | 0 | 0 | 0 | . . . | 0 | 0 | 0 | 0 | 0 | 0 | 1 | 0 | 1 |
| I Bus 4 | *0 | 0 | 1 | 0 | 1 | 0 | 1 | 0 | . . . | 0 | 0 | 0 | 0 | 0 | 0 | 1 | 0 | 1 |
| III Bus 6 | 0 | 0 | 0 | 0 | 0 | 0 | 0 | 0 | . . . | 0 | 1 | 1 | 0 | 1 | 0 | 0 | 0 | 0 |
| II Bus 12 | 1 | 0 | 0 | 0 | 0 | 0 | 0 | 0 | . . . | 0 | 0 | 0 | 0 | 0 | 0 | 0 | 0 | 0 |
| I Bus 14 | 1 | 0 | 1 | 0 | 1 | 0 | 1 | 0 | . . . | 0 | 0 | 0 | 0 | 0 | 0 | 0 | 0 | 0 |
| I Bus 15 | 0 | 0 | 0 | 0 | 0 | 0 | 0 | 0 | . . . | 0 | 0 | 0 | 0 | 0 | 0 | 1 | 0 | 1 |

*Transmitted as a "1" and incorrectly received as a "0".

In summary, the table XI illustrates the receipt of 64 information bits D0 through D63 on bus 1 and the generation of eight check bits C1 through C8 on bus 3 by the check bit generator 2. The two sections are placed on the communication path 4 as a 72 bit code word and transmitted to a receiver, an error occurring in bit position D0. The error detector 5 monitors the 72 bits of the communication path 4 and places on the bus 6 lines S1 through S8 syndrome signals indicating the code groups affected by the error in the position D0. The error locator 11 generates, as a function of the syndrome signals and single error signal, a signal on the 72 bit bus 12 indicating the location of the error and the error corrector 13 then inverts the bit D0 to place a corrected code word on buses 14 and 15.

In detail, the signals on bus 1 apply inputs to check bit generator 2 Exclusive OR circuits ⊻1 through ⊻8, ⊻10, ⊻15, ⊻22 and ⊻33 in the first level; ⊻56 through ⊻61, ⊻63, ⊻65, ⊻67 and ⊻78 in the second level; and, all the circuits ⊻80 through ⊻87 in the third level. As a result, check bit signals appear on output lines C6 and C8. During transmission of the code word on bus 4, an error occurs in information bit position D0 causing it to change to a zero bit. The code word is received at the error detector 5 on bus 4, the changed condition of information bit D0 being detected by Exclusive OR circuits ⊻1 and ⊻33 in the first level; ⊻56, ⊻60 and ⊻78 in the second level; and ⊻80, ⊻81 and ⊻83 in the third level to place syndrome signals on lines S1, S2 and S4. In FIG. 1, OR-circuit 7 detects an error and Exclusive OR-circuit 8 recognizes the odd number of syndrome signals on bus 6 as a single error. In FIG. 4, the error locator 11 receives inputs on lines S1, S2, S4 and the single error line causing AND-circuit 36 to supply a signal on "line incorrect" line D0. The error corrector 13 may comprise 72 two-input Exclusive OR circuits, each receiving one input from bus 4 and a corresponding input from bus 12. The error corrector inverts position D0, but otherwise passes the code word on bus 4 to buses 14 and 15.

Principles Involved

The principles underlying the invention will now be described. In order to have an SEC/DED code, four is the minimum weight requirement which implies that three or fewer columns of the matrix are linearly independent. One way to satisfy this condition is to have the columns of the matrix meet the following constraints:

1. No all-0 columns.
2. Every column is distinct.
3. Every column contains an odd number of 1's (hence odd weight).

The first two constraints give a Hamming distance 3 code. The additional third constraint guarantees the code thus generated to have distance 4. The proof considers that the modulo 2 sum of any three odd-weight columns never equals 0. In general, the modulo 2 vector addition of any even number of odd-weight vectors will always give an even-weight vector including the weight 0 vector. This general statement is actually used for double-error detection. Next, it is realized that the total number of ones in each row of the matrix relates to the number of logic levels necessary to generate the check bit or syndrome of that row. Let $t_i$ be the total number of ones in the $i$th row, and $C_i$ and $S_i$ be the check bit and syndrome bit specified by the $i$th row of the matrix, respectively. Then:

$$l_{c_i} = [\log_v(t_i - 1)] \qquad (1)$$

$$l_{s_i} = [\log_v t_i] \qquad (2)$$

where $l_{c_i}$ = logic levels required to generate $C_i$ if only a $v$-input module 2 adder is used, $l_{s_i}$ = logic levels required to generate $S_i$ if only a $v$-input modulo 2 adder is used, and $[X]$ is the smallest integer greater than or equal to $X$. In practical applications, $v$ is fixed for a given circuit family. Therefore, in order to minimize $l_{s_i}$, the minimum $t_i$ is desired. If all $t_i (i=1, 2, \ldots, r)$ are minimum and equal, then we have the fastest encoding and error detection in the decoding process. These are the most critical on-line processes in the memory operations. In general, in the case of the code with minimum $t_i$ also requires less hardware for implementation. Therefore, the minimum number of $t_i$ for all $i$ is very important. The codes constructed by this process always have a fewer number of ones in the matrix than the Hamming SEC/DED codes.

The construction process of the code is best described in terms of a parity check matrix. The selection of the columns of the matrix for a given $(n,k)$ code is based on the following three constraints:

Every column should have an odd number of ones; i.e., all column vectors are of odd weight. The total number of ones in the matrix is minimum. The number of ones in each row of the matrix should be made equal to or as close as possible to the average number; i.e., the total number of ones in the matrix H divided by the number of rows.

If $r$ parity check bits are used to match $k$ data bits, then the following equation must be true:

$$\sum_{\substack{i=1 \\ i=\text{odd}}}^{\le r} \binom{r}{i} \ge r+k \qquad (3)$$

It can be shown that this code uses the same number of check bits as that of the Hamming SEC/DED code. For an unshortened Hamming SEC/DED code:

$$2^{r-1} = k + r \qquad (4)$$

but $$\sum_{i=0}^{r} \binom{r}{i} = 2^r \qquad (5)$$

and $$\sum_{\substack{i=0 \\ i=\text{even}}}^{\le r} \binom{r}{i} = \sum_{\substack{i=1 \\ i=\text{odd}}}^{\le r} \binom{r}{i} \qquad (6)$$

therefore $$\sum_{\substack{i=1 \\ i=\text{odd}}}^{r} \binom{r}{i} = \tfrac{1}{2} 2^r = 2^{r-1} \qquad (7)$$

By comparing equations (4) and (7), it is noticed that the same number of $r$ check bits is required for both codes. The matrix is constructed as follows:

1. $\binom{r}{1}$ columns are always used for $r$ check-bit positions.

2. Next, if $\binom{r}{3} \ge k$, then select $k$ columns out of all possible $\binom{r}{3}$ combinations. If $\binom{r}{3} < k$, then all possible $\binom{r}{3}$ columns are selected. The leftover columns are then first picked up from all possible $\binom{r}{5}$ etc. the process is continued until all $k$ columns are fulfilled.

If codeword length $n=k+r$ is exactly equal to $$\sum_{\substack{i=1\\ i=\text{odd}}}^{j\leq r} \binom{r}{i}$$

for some odd $j \leq r$, then each row of the matrix will have exactly $$\frac{\sum_{\substack{i=1\\ i=\text{odd}}}^{j\leq r} i\binom{r}{i}}{r} = \frac{1}{r}\left[r \div 3\frac{r(r-1)\ (r-2)}{3!} + \cdots j\frac{r(r-1)\ \ldots\ (r-j+1)}{j!}\right]$$
$$=\left[1+\binom{r-1}{2}+\ \ldots\ \div\binom{r-1}{j-1}\right]$$
$$=\text{integer } q \qquad (8)$$

$q$ number of ones. If $n$ is not exactly equal to $$\sum^{j} \binom{r}{i}$$

for some $j$, then the arbitrary selection of the $$\binom{r}{i}$$

cases should make the number of ones in each row close to the average number as shown in table X.

The double-error detection is accomplished by examining the overall parity of all syndrome bits. For an even number of syndrome bits, a double or an even number of errors is assumed. Since all errors are assumed to be statistically independent, multiple even errors are treated as if they were double errors. This double-error detection is different from the Hamming code. In the case of Hamming code, a special bit, which is generated by an all–1 row ($n$ 1's) in the matrix, is examined to determined whether a single (odd) or double (even) error has occurred. The elimination of all–1 rows in the matrix improves the speed of encoding and decoding for error detection. Another important factor of the parity check matrix, which improves the speed of encoding and decoding for error detection, is due to the total number of ones contained in the matrix, which is always less then with Hamming code. Moreover, the new matrix is designed such that $t_i \leq [A]$ for all $i$ and [A] (the average number shown in table I) is always less than the number of ones in the row containing the maximum number of ones in the matrix of the Hamming SEC/DED code.

While the invention has been shown and described with reference to preferred embodiments thereof, it will be understood by those skilled in the art that the foregoing and other changes in form and details may be made therein without departing from the spirit and scope of the invention.

What is claimed is:

1. In a system for detecting and correcting errors in code words having a plurality of information bits and a plurality of check bits each assigned to a number of code groups, an improved check bit generator comprising:

input means for accepting signals manifesting information bits;

a number of logic groupings, one for each code group, each connected to the input means to accept those information bit signals that are assigned to its code group and to supply at an output one check bit signal manifesting a function of the information bit signals in its code groups; and a plurality of connection means for connecting said input means and said logic groupings, an odd number of said connection means connecting each information bit signal from said input means to an equal odd number of logic groupings, said odd number of connection means and said odd number of logic groupings increasing in order from $$\binom{r}{m}$$

to less than $$\binom{r}{r}$$

where $r$ is the number of check bits and $m$ is an odd number greater than one, and said connection means connecting a substantially equal number of information bit signals from said input means to each logic grouping.

2. The check bit generator of claim 1, wherein the check bit manifests an Exclusive OR function of the information bit signals in its code group.

3. The check bit generator of claim 2, wherein the code word is divided into bytes containing substantially equal numbers of bits and wherein said connection means provide each information bit signal to logic groupings in order from $$\binom{r}{m}$$

to less than $$\binom{r}{r}$$

groupings for each byte in turn.

4. In a system for detecting and correcting errors in code words having a plurality of information bits and a plurality of check bits each assigned to a number of code groups, an improved error detector comprising:

input means for accepting signals manifesting information bits and check bits;

a number of logic groupings, one for each code group, each connected to the input means to accept those information and check bit signals that are assigned to its code group and to supply at an output one syndrome signal manifesting a function of the information and check bit signals in its code group; and a plurality of connection means for connecting said input means and said logic groupings an odd number of said connection means connecting each information and check bit signal from said input means to an equal odd number of logic groupings, said odd number of connection means and said odd number of logic groupings increasing in order from $$\binom{r}{m}$$

to less than $$\binom{r}{r}$$

where $r$ is the number of check bits and $m$ is an odd number greater than one, said connection means connecting a substantially equal number of information and check bit signals from said input means to each logic grouping.

5. The error detector of claim 4, wherein the syndrome signal manifests an Exclusive OR function of the information and check bit signals in its code group.

6. The error detector of claim 5, wherein the code word is divided into bytes containing substantially equal numbers of bits and wherein said connection means provide each information and check bit signals to logic groupings in order from $$\binom{r}{m}$$

to less than $$\binom{r}{r}$$

groupings for each byte in turn.

7. The error detector of claim 6, wherein $n$ equals one for check bit signals and $m$ equals an odd number greater than one for information bit signals.

8. The error detector of claim 4, wherein a signal indicating the existence of any errors is generated as an OR function of said syndrome signals and signals distinguishing single from double errors are generated as an Exclusive OR function of said syndrome signal.

9. The system of claim 4, wherein there is provided an improved error locator comprising:
syndrome sensing means, connected to said logic grouping outputs, for supplying said syndrome signals; and
a plurality of logic circuits, connected to said syndrome sensing means, for supplying on a plurality of outputs, each associated with a different one of the code word bits, signals indicating the location of an error, each circuit output signal being an AND function of at least those syndrome signals which are a function of the associated code word bit.

10. The system of claim 4, wherein there is provided an improved error locator comprising:
syndrome sensing means, connected to said logic grouping outputs, for supplying said syndrome signals; and
a plurality of logic circuits, connected to said syndrome sensing means, for supplying on a plurality of outputs, each associated with a different one of the code word bits, signals indicating the location of an error, each circuit output signal being an AND function of at least those syndrome signals which are a function of the associated code word bit.

11. The system of claim 5, wherein there is provided an improved error locator comprising:
syndrome sensing means, connected to said logic grouping outputs, for supplying said syndrome signals; and
a plurality of logic circuits, connected to said syndrome sensing means, for supplying on a plurality of outputs, each associated with a different one of the code word bits, signals indicating the location of an error, each circuit output signal being an AND function of at least those syndrome signals which are a function of the associated code word bit.

12. The system of claim 6, wherein there is provided an improved error locator comprising:
syndrome sensing means, connected to said logic groupings outputs, for supplying said syndrome signals; and
a plurality of logic circuits, connected to said syndrome sensing means, for supplying on a plurality of outputs, each associated with a different one of the code word bits, signals indicating the location of an error, each circuit output signal being an AND function of at least those syndrome signals which are a function of the associated code word bit.

13. The system of claim 7, wherein there is provided an improved error locator comprising:
syndrome sensing means, connected to said logic grouping outputs, for supplying said syndrome signals; and
a plurality of logic circuits, connected to said syndrome sensing means, for supplying on a plurality of outputs, each associated with a different one of the code word bits, signals indicating the location of an error, each circuit output signal being an AND function of at least those syndrome signals which are a function of the associated code word bit.

14. In combination:
a check bit generator for generating a plurality of check bits as a function of selected ones of a plurality of information bits, the related check and information bits forming a code group;
a communication path for transmitting said bits;
an error detector, connected to said path, for monitoring the code groups and generating as a function of the monitored bits one syndrome signal for each code group;
a logic circuit, connected to said error detector, operative by one or more syndrome signals to indicate the existence of an error, operative by an odd number of syndrome signals of one kind to indicate the existence of a condition treated as a correctable single error and operative by an even number of syndrome signals of said one kind to indicate the existence of a condition treated as an uncorrectable error;
an error locator, connected to said error detector, operative as a function of syndrome signals from the error detector, to supply a plurality of indications each corresponding to one of the plurality of information and check bits on the communication path; and
an error corrector, connected to said path and to said error locator, operative as a function of the indications from the error locator to correct incorrect bits on said path.

15. The combination of claim 14, wherein the check bit generator further comprises:
a plurality of circuit means for generating one check bit as a f ınction of all information bits in its code group, each circuit means being associated with a substantially equal number of information bits and each information bit being associated with an odd number of circuit means, said odd number being chosen from the numbers 3, 5,...,*r* in order, where 5 approaches the number of check bits, all possible combinations of each number being used before the next is chosen.

16. The combination of claim 14, wherein the error detector further comprises:
a plurality of circuit means for generating one syndrome signal as a function of all information and check bits in a code group, each circuit means being associated with a substantially equal number of information and check bits and each information and check bit being associated with an odd number of circuit means, said odd number being chosen from the numbers 1, 3, 5,...,*r* in order, where *r* approaches the number of check bits, all possible combinations of each number being used before the next is chosen.

17. The combination of claim 14, wherein the error detector further comprises:
a plurality of circuit means for generating one syndrome signal as a function of all information and check bits in a code group, each circuit means being associated with a substantially equal number of information and check bits and each information and check bit being associated with an odd number of circuit means, said odd number being chosen from the numbers 1, 3, 5,...,*r* in order, where *r* approaches the number of check bits, all possible combinations of each number being used before the next is chosen.

18. In a system for correcting at a receiver code words sent by a transmitter, wherein:
the transmitter includes a check bit generator for generating a plurality of check bits as a function of a plurality of information bits, associated check and information bits defining a code group; and
the receiver includes an error detector for supplying a number of syndrome signals, equal to the number of code groups, as a function of the information and check bits in each code group, and an error locator operative in accordance with the syndrome signals to identify the location in the code words of correctable errors;
the improvement comprising:
a. a check bit generator comprising sets of Exclusive OR circuits, each set corresponding to one row of the matrix shown in FIG. 2 and having an output labeled by a one in columns C1 through C8 and inputs labeled by ones in columns D0 through D63 for its row;
b. an error detector comprising sets of Exclusive OR circuits, each set corresponding to one row of the matrix shown in FIG. 2 and having one output for each row and inputs labeled by ones in all columns for its row; and
c. an error locator comprising sets of AND circuits, each set corresponding to one column of the matrix shown in FIG. 2 and having one output for each column and at least those inputs labeled by ones in all rows for its column.

19. The method of designing an error detecting and correcting system by representing the connections by a matrix of ones defining the relationship of *k* information or check bit and each row a code group containing related information and check bits, including the steps of:

assigning each check bit to one different code group;

assigning information bits to three code groups until all possible combinations of three code groups are exhausted;

assigning additional information bits to five code groups until all possible combinations of five code groups are exhausted; and assigning further information bits to *m* code groups, where *m* is each odd number taken in order of increasing magnitude until *n–k* is reached.

20. In a system for correcting at a receiver errors in code words sent by a transmitter, each code word including information bits and check bits generated as a function of selected associated information bits, each information bit being associated with an odd number of check bits; an improved means for distinguishing single errors from double errors, comprising:

a first logic circuit, having a number of inputs each responsive to a function of a different check bit and its associated information bits and having an output for indicating that an error has occurred; and a second logic circuit, having a number of inputs each responsive to aforesaid function of a different check bit and its associated bits and having as another input thereto an output from said first logic circuit indicating that an error occurred, and having a number of outputs for indicating which of a single error and a double error has occurred.

* * * * *

PO-1050
(5/69)

UNITED STATES PATENT OFFICE
CERTIFICATE OF CORRECTION

Patent No. 3,623,155 Dated November 23, 1971

Inventor(s) Mu-Yue Hsiao, Eugene Kolankowsky

It is certified that error appears in the above-identified patent and that said Letters Patent are hereby corrected as shown below:

Column 14, line 5, delete the formula $(m^r)$ and substitute the formula $\binom{r}{m}$.

Column 14, line 7, delete the formula $(r^r)$ and substitute the formula $\binom{r}{r}$.

Column 14, line 21, delete the formula $(m^r)$ and substitute the formula $\binom{r}{m}$.

Column 14, line 23, delete the formula $(r^r)$ and substitute the formula $\binom{r}{r}$.

Column 14, line 46, delete the formula $(m^r)$ and substitute the formula $\binom{r}{m}$.

Column 14, line 48, delete the formula $(r^r)$ and substitute the formula $\binom{r}{r}$.

Column 14, line 62, delete the formula $(m^r)$ and substitute the formula $\binom{r}{m}$.

Column 14, line 64, delete the formula $(r^r)$ and substitute the formula $\binom{r}{r}$.

Column 16, line 73, after the word "information", insert 623-2721-0

PO-1050
(5/69)

UNITED STATES PATENT OFFICE
CERTIFICATE OF CORRECTION

Patent No. 3,623,155 Dated November 23, 1971

Inventor(s) Mu-Yue Hsiao, Eugene Kolankowsky PAGE - 2

It is certified that error appears in the above-identified patent and that said Letters Patent are hereby corrected as shown below:

the following words --bits and n-k check bits, wherein each column represents an information--.

Signed and sealed this 16th day of May 1972.

(SEAL)
Attest:

EDWARD M.FLETCHER,JR.
Attesting Officer

ROBERT GOTTSCHALK
Commissioner of Patents 623-2721-0